United States Patent [19]  
Marshall

[11] Patent Number: 4,767,726  
[45] Date of Patent: Aug. 30, 1988

[54] GLASS MICROBUBBLES
[75] Inventor: Harry J. Marshall, Hudson, Wis.
[73] Assignee: Minnesota Mining and Manufacturing Company, Saint Paul, Minn.
[21] Appl. No.: 2,637
[22] Filed: Jan. 12, 1987
[51] Int. Cl.$^4$ .............. C03C 11/00; C03C 12/00; C03C 14/00; C03C 3/089
[52] U.S. Cl. .................................. 501/33; 501/32; 501/39; 501/65
[58] Field of Search .................. 501/33, 39, 32
[56] References Cited

U.S. PATENT DOCUMENTS

| | | | |
|---|---|---|---|
| 2,978,340 | 4/1961 | Veatch et al. | 501/33 |
| 3,030,215 | 4/1962 | Veatch et al. | 501/33 |
| 3,129,086 | 4/1964 | Veatch et al. | 65/142 |
| 3,230,064 | 1/1966 | Veatch et al. | 65/142 |
| 3,365,315 | 1/1968 | Beck et al. | 501/33 |
| 4,391,646 | 7/1983 | Howell | 501/33 |
| 4,661,137 | 4/1987 | Garnier et al. | 501/33 |

FOREIGN PATENT DOCUMENTS 165875 12/1985 European Pat. Off. .
49-37565 10/1974 Japan .

Primary Examiner—Mark L. Bell  
Attorney, Agent, or Firm—Donald M. Sell; Richard E. Brink

[57] ABSTRACT

Glass microbubbles having, on a weight basis, a composition consisting essentially of 70–80% $SiO_2$, 8–15% CaO, 3–8% $Na_2O$, and 2–6% $B_2O_3$, and about 0.2–1.5% $SO_3$ and having a CaO:$Na_2O$ ratio of 1–3.5. These microbubbles, which are made of significantly less expensive raw materials than conventional products, can also be made with a higher percent "floaters" and a lower average density. Certain substitutions can be made for at least a portion of each of the first three oxides.

18 Claims, No Drawings

GLASS MICROBUBBLES

BACKGROUND OF THE INVENTION

This invention relates to glass microbubbles and is especially concerned with bubbles having a novel composition.

Glass microbubbles have been known for many years, as is shown by U.S. Pat. Nos. 2,978,340, 3,030,215, 3,129,086 and 3,230,064, all of which teach a process of manufacture involving simultaneous fusion of the glass-forming components and expansion of the fused mass; these bubbles, however, are extremely water-sensitive and may disintegrate when incorporated in aqueous compositions, e.g., wall repair compounds. U.S. Pat. No. 3,365,315 discloses the formation of water-resistant discrete free-flowing masses of glass bubbles by "blowing", or expanding, amorphous glass frit. This patent discloses an extremely broad range of possible components, embracing almost all conventional glasses. U.S. Pat. No. 4,391,646 also discloses the formation of glass bubbles from frit, the resultant product consisting essentially of 60-90% $SiO_2$, 2-20% alkali metal oxide, 1-30% $B_2O_3$, 0.005-0.5% sulfur (0.0125-1.25% if calculated as $SO_3$) and other conventional glass-forming ingredients. Glass microbubbles made in accordance with these patents have achieved wide industrial use, but the inclusion of such raw materials as lithium carbonate, potassium carbonate, and sodium pyrophosphate in the raw materials used to prepare the frit from which the commercial product is obtained, increase cost.

Japanese laid-open application A 49-37565 discloses 6 glass compositions, all of which have conventional ratios of alkaline earth metal oxides to alkali metal oxides (i.e., 1.0 or less). This patent also teaches that, to avoid excessively high viscosities and devitrification, at least 10.0% $Na_2O$ or 13.0% ($Na_2O$ plus $K_2O$) should be included.

European Patent Application No. 165875 discloses that using a reducing atmosphere when flame-forming the glass bubbles, particularly for very small feed particles of less than 20 micrometers, increases the effectiveness of the sulfate blowing agent. All examples, however, have conventional ratios of alkaline earth metal oxide to alkali metal oxides.

BRIEF DESCRIPTION

The present invention provides microbubbles that are water-resistant, can have the superior performance properties attributed to microbubbles of U.S. Pat. No. 4,391,646, and are made by the same general "blowing" method disclosed in that patent. In its simplest and least expensive embodiment, however, the present microbubbles are made from a borosilicate glass and have a chemical composition consisting essentially of $SiO_2$, CaO, $Na_2O$, $B_2O_3$, and $SO_3$ blowing agent. The yield of microbubbles obtained from frit is also higher than in the prior art. An unusual and characterizing feature of the invention resides in the alkaline metal earth oxide:alkali metal oxide ($RO:R_2O$) ratio, which substantially exceeds 1:1 and lies above the ratio present in any previously utilized simple borosilicate glass compositions. As the $RO:R_2O$* ratio increases above 1:1, simple borosilicate compositions become increasingly unstable, devitrifying during traditional working and cooling cycles, so that "glass" compositions are not possible unless stabilizing agents such as $Al_2O_3$ are included in the composition. In practicing the present invention, such unstable compositions have been found to be highly desirable for making glass microbubbles, rapid cooling of the molten gases by water quenching, to form frit, preventing devitrification. During subsequent bubble forming, as taught in aforementioned U.S. Pat. Nos. 3,365,315 and 4,391,646, the bubbles cool so rapidly that devitrification is prevented, despite the fact that the $RO:R_2O$ ratio increases even further because of loss of the relatively more volatile alkali metal oxide compound during forming.

* As used herein, "R" refers to a metal having the valence indicated, RO being an alkaline earth metal oxide and $R_2O$ and alkali metal oxide.

The present invention provides glass bubbles having a density ranging from 0.08 or less to 0.8g/cc, the less dense products being more economical per unit volume. Glass bubbles having a higher density are, however, particularly useful where an inexpensive and comparatively light weight reinforcing filler having high resistance to crushing is desired.

In one aspect the present invention can be characterized as glass microbubbles in which the chemical composition, expressed in weight percent, consists essentially of at least 67% $SiO_2$, 8-15% RO, 3-8% $R_2O$, 2-6% $B_2O_3$, and 0.125-1.50% $SO_3$, the foregoing components constituting at least about 90% (preferably 94% and still more preferably 97%) of the glass, the $RO:R_2O$ weight ratio being in the range of 1.0-3.5.

The utility of glass microbubble is very dependent upon density, strength, water-sensitivity, and cost. In general this means that high silica contents are to be preferred but there are limitations, because in the initial glass preparation, the higher temperatures and longer melt times required for higher silica glasses reduce the amount of blowing agent that can be retained, preventing the formation of the more desirable low density glass bubbles.

To obtain microbubbles having a low density (e g., less than 0.2 gram per cc) it is difficult to retain enough blowing agent during the initial glass melting operation. Retention of blowing agent is improved if a small amount of lithia is included as one of the alkali metal oxides in the glass composition; such compositions are, however, more expensive than when soda is the sole alkali metal oxide. The retention of blowing agent is also apparently improved by including a small amount of $P_2O_5$ in the glass composition. If desired, both $Li_2O$ and $P_2O_5$ can be included.

When low densities are not desired, a great many substitutions can be made in the glass composition to modify the physical and chemical properties of the microbubbles, or to improve the glass melting operation. For example, a small amount of alumina can be introduced by including feldspar or spodumene in the glass batch, thereby also introducing small quantities of alkali metal oxides other than $Na_2O$ into the glass. By using a dolomitic limestone rather than calcium carbonate, MgO can also be substituted for CaO.

Although limiting the amount of boric oxide would reduce cost, experience has shown that the frit composition should contain about 10% $B_2O_3$ to facilitate the overall glass making and forming process.

For a maximum conversion of feed particles to microbubbles, it has been found that the preferred $RO:R_2O$ ratio in the frit is about 1.4, which results in a ratio of about 2.0 in the glass microbubbles. It is noted, however, that frits having a lower ratio are easier to melt, while those having a higher ratio exhibit less volatile loss during the bubble forming step.

DETAILED DESCRIPTION

The invention will now be further explained through the use of illustrative but non-limiting examples. All parts and percentages are by weight unless otherwise noted.

EXAMPLES 1-8

In this series of examples, the CaO:Na$_2$O ratio in the prepared frits is varied from approximately 0.8:1 to 2.0:1, maintaining a constant level of SiO$_2$ (70.0%) and B$_2$O$_3$ (10.0%).

All the examples were prepared as follows:

Glass-forming batches were prepared by mixing together particles of SiO$_2$ (silica flour), Na$_2$O:2B$_2$O$_3$ (anhydrous borax, 90% smaller than 590 micrometers), CaCO$_3$ (97% smaller than 44 micrometers), Na$_2$CO$_3$ (soda ash), and Na$_2$SO$_4$ (60% smaller than 74 micrometers) in the amounts listed. Mixing was carried out by tumbling for 3 minutes in an 8.7-liter jar mill with 6000 grams of alumina grinding cylinders. The batches were melted for 3 hours in so-called "fused silica" refractory crucibles at a temperature of about 1290° C. (2350° F.) in a quick recovery electrically heated furnace. The resulting molten glasses were quenched in water, and then dried to give the series of frits.

500 grams of each prepared frit was then placed in an 8.7-liter jar mill with 6000 grams of alumina grinding cylinders and milled together for one half hour. The mill outputs were classified by the use of screens and air elutriation to give 150-gram quantities (±15 grams) of glass bubble feed particles of which 90% were smaller than 47.5 μm (±2.5 μm), 50% smaller than 24 μm (±1.0 μm) and 10% smaller than 7.0 μm (±1.0 μm). The size distribution for each batch was measured using a Leeds and Northrup Particle Size Analyzer, Model No. 7991-01.

TABLE I

| | | Batch Compositions | | | |
|---|---|---|---|---|---|
| Example No. | Target CaO:Na$_2$O weight ratio in frit | Parts by weight (grams) | | | |
| | | SiO$_2$ | Na$_2$O:2B$_2$O$_3$ | Na$_2$SO$_4$ | CaCO$_3$ | Na$_2$CO$_3$ |
| 1 | 0.8 | 600 | 123.9 | 20.0 | 136.2 | 82.5 |
| 2 | 1.0 | 600 | 123.9 | 20.0 | 153.0 | 66.4 |
| 3 | 1.2 | 600 | 123.9 | 20.0 | 166.9 | 53.1 |
| 4 | 1.3 | 600 | 123.9 | 20.0 | 172.9 | 47.3 |
| 5 | 1.4 | 600 | 123.9 | 20.0 | 178.5 | 41.9 |
| 6 | 1.6 | 600 | 123.9 | 20.0 | 188.3 | 32.5 |
| 7 | 1.8 | 600 | 123.9 | 20.0 | 196.7 | 24.5 |
| 8 | 2.0 | 600 | 123.9 | 20.0 | 204.1 | 17.4 |

The bubble feed samples for Examples 1, 3, 5, 7 and 8 were quantitatively analyzed to compare the actual oxide compositions of the frits to the intended calculated compositions. In all cases the aggregate weight percent of Al$_2$O$_3$, MgO, and Fe$_2$O$_3$ was less than 0.42% and there was less than 0.02% each of Li$_2$O, ZnO, and P$_2$O$_5$.

TABLE II

| | Major Oxide Content of Glass Bubble Feeds | | | | | |
|---|---|---|---|---|---|---|
| Example No. | Weight Percent Oxide | | | | | Indicated Ratio of CaO:Na$_2$O by weight in feeds |
| | SiO$_2$ | B$_2$O$_3$ | CaO | Na$_2$O | SO$_3$ | |
| 1 | 69.9 | 10.0 | 8.4 | 11.2 | 0.71 | 0.75 |
| 3 | 69.7 | 10.0 | 10.5 | 8.7 | 0.91 | 1.2 |
| 5 | 69.6 | 9.95 | 11.3 | 8.0 | 0.95 | 1.4 |
| 7 | 69.9 | 9.90 | 12.1 | 6.9 | 0.98 | 1.8 |
| 8 | 69.5 | 9.85 | 12.4 | 6.3 | 1.5 | 2.0 |

A 30-gram aliquot of each bubble feed sample was passed through a natural gas/air flame of approximately stoichiometric proportions with a combustion air flow calculated to be about 250 liters/minute at standard temperature and pressure. The air:gas ratio was adjusted to yield the lowest total product density for a feed rate of 10 grams per minute. The flame-formed product was cooled by mixing with ambient temperature air and then separated from the resulting gas stream with a cyclone device.

In each case the resulting glass bubble-containing mass of free-flowing glass particles was then characterized by (1) measuring the average true particle density of the total product material, using a Model 930 Beckman Air Comparison Pycnometer to determine the volume of a known mass, (2) determining the fraction of glass bubbles having a density less than 1.0 g/cc using a centrifuge technique, and (3) measuring the average true particle density of this bubble fraction. The results of these determinations are listed below, along with the corresponding amount of the total product materials recovered, expressed as a percentage of the bubble feed input.

TABLE III

| | Results of Bubble Forming | | | |
|---|---|---|---|---|
| Example No. | Weight percent of feed collected as total product | True particle density of total product | Weight percent bubbles in total product | True particle density of bubbles |
| 1 | 87.0 | 0.266 | 77.6 | 0.212 |
| 2 | 86.6 | 0.227 | 80.8 | 0.187 |
| 3 | 85.5 | 0.192 | 82.6 | 0.161 |
| 4 | 85.2 | 0.174 | 84.6 | 0.149 |
| 5 | 84.9 | 0.170 | 84.3 | 0.145 |
| 6 | 86.7 | 0.178 | 78.4 | 0.142 |
| 7 | 84.5 | 0.186 | 75.3 | 0.143 |
| 8 | 85.6 | 0.217 | 66.5 | 0.149 |

The general size distribution of the glass bubbles of Examples 1 through 8 was determined using 170, 230, and 400 mesh screens (U.S. Series). The results showed that 10-20% of the bubbles were larger than 88 μm, approximately 40% were between 88 and 62 μm, from 20-30% were between 62 and 37 μm, and 10-20% were smaller than 37 μm.

When the size distribution of the "sinkers" for Example 5 was also measured with the Leeds and Northrup Particle Size Analyzer, 90% were found to be smaller than 87.7 μm, 50% smaller than 39.6 μm, and 10% smaller than 14.4 μm. Because both beads and broken microbubbles were present, the particle size disbribution is somewhat coarser than for the bubble feed.

For Examples 1, 3, 5, 7, and 8, samples of the glass bubbles separated from the total product were quantitatively analyzed to determine their major oxide compositions. For Example 5, the material separated from the glass bubbles by centrifuging ("sinkers") was also analyzed, results for the main oxide components being listed below. In all but one case the total weight percent of $Al_2O_3$, MgO, $Fe_2O_3$, $Li_2O$, $K_2O$, $P_2O_5$, and ZnO was less than 0.62; the total for the "sinkers" of Example 5 was less than 0.92%.

TABLE IV

Quantitative Analysis of Glass Bubbles Including "Sinkers" of Example 5 (Major Oxides Only)

| Example No. | Weight % of metal oxide | | | | | Indicated ratio of $CaO:Na_2O$ in bubbles |
|---|---|---|---|---|---|---|
| | $SiO_2$ | $B_2O_3$ | CaO | $Na_2O$ | $SO_3$ | |
| 1 | 76.2 | 3.73 | 9.21 | 7.60 | 0.75 | 1.21 |
| 3 | 76.3 | 3.57 | 11.3 | 6.04 | 0.91 | 1.86 |
| 5 | 76.0 | 4.09 | 12.7 | 5.72 (bubbles) | 0.85 | 2.24 |
| 5 | 72.2 | 8.77 | 11.3 | 7.50 (sinkers) | 1.10 | 1.51 |
| 7 | 74.6 | 4.25 | 13.2 | 4.88 | 0.90 | 2.70 |
| 8 | 75.2 | 4.23 | 14.0 | 4.46 | 0.99 | 3.14 |

The results for Examples 1 through 8 show a strong influence of the $CaO:Na_2O$ ratio in the feed upon the fraction of glass bubbles produced during forming. The amount of blowing agent retained in the frit during melting (expressed as %$SO_3$) is also influenced by this ratio. The preferred $CaO:Na_2O$ ratio in the feed, for a maximum yield of glass bubbles, would seem to be around 1.4, which gives a ratio of about 2.0 in the glass bubbles. Experience has shown that the yield of glass bubbles in the total product is not influenced by the amount of blowing agent in the feed, but the density of the bubbles is directly controlled by the blowing agent level.

When the total product material is separated into "floaters" and "sinkers" by a centrifuge technique, the density of the sinkers is found to be very close to the theoretical density of the glass, i.e., approximately 2.3 g/cc, the sinkers consisting of broken bubbles and solid beads.

A wide range of total product densities can be obtained, all with a maximum yield of floaters (cf. Examples 4 and 5) by including different amounts of sulfate in the glass-forming batch; cf. Examples 9–14.

EXAMPLES 9–14

In this series of examples, the only variable is the amount of sulfate in the batch compositions. The purpose of these examples is (1) to demonstrate the wide range of total product densities (with very high fractions of glass bubbles) that can be generated from a given glass composition and (2) to determine whether the fraction of glass bubbles in the total product is dependent on the sulfur level in the glass.

The batch compositions for this series are identical to that for Example 4, except for the weights of sodium sulfate and the corresponding weight of sodium carbonate, which are adjusted to keep the total sodium oxide content constant. These weights are listed below, along with the amounts of sulfur (expressed as $SO_3$), measured in the resulting bubble feed samples. The sulfur values were determined by iodine titration, measuring the $SO_2$ evolved from a feed sample when heated to 1500° C.

Glass-forming batches were prepared by mixing together 600 grams $SiO_2$, 123.9 grams $Na_2O:B_2O_3$, 172.9 grams $CaCO_3$, and varying quantities of $Na_2CO_3$ and $Na_2SO_4$ as listed below:

TABLE V

Batching Details for Examples 9–14

| Example No. | Grams $Na_2SO_4$ | Grams $Na_2CO_3$ | Percent $SO_3$ measured in bubble feed |
|---|---|---|---|
| 9 | 25 | 43.6 | 0.92 |
| 4 | 20 | 47.3 | 0.87 |
| 10 | 15 | 51.0 | 0.75 |
| 11 | 10 | 54.8 | 0.60 |
| 12 | 5 | 58.5 | 0.32 |
| 13 | 4 | 59.2 | 0.25 |
| 14 | 3 | 60.0 | 0.20 |

The batches were melted as in Examples 1–8, quenched in water, and then dried to give a series of frits. The frits were then milled, classified, and the size distribution measured, all as in Examples 1–8, to give 150-gram quantities (±12 grams) of glass bubble feed particles having size distributions of 90% smaller than 47.5 μm (±3.6 μm), 50% smaller than 24.8 μm (±1.8 μm), and 10% smaller than 7.4 μm (±1.6 μm).

A 30-gram aliquot of each bubble feed sample was then passed through a natural gas/air flame as in Examples 1–8. Each resulting free-flowing mass of glass particles was then collected and characterized as in Examples 1–8. Results are tabulated below:

TABLE VI

Results of Bubble Forming

| Example No. | Fraction of total product collected as a % of feed | Total product density, g/cc | Weight percent bubbles in total product | Density of bubbles, g/cc |
|---|---|---|---|---|
| 9 | 84.1 | 0.169 | 84.8 | 0.145 |
| 4 | 85.2 | 0.174 | 84.6 | 0.149 |
| 10 | 83.8 | 0.199 | 85.9 | 0.173 |
| 11 | 83.9 | 0.245 | 85.6 | 0.213 |
| 12 | 82.5 | 0.433 | 83.2 | 0.372 |
| 13 | 82.0 | 0.531 | 81.1 | 0.455 |
| 14 | 88.2 | 0.712 | 71.4 | 0.574 |

The results show that over the range of total product densities covered by Examples 1 through 8, the sulfur level had no influence on the bubble fraction in the total product material. In fact, the $SO_3$ level can be reduced to 0.60% before there is any apparent reduction in the percentage of bubbles obtained in a glass composition such as that of Example 4.

In Examples 12, 13 and 14, the percentage of bubbles appears to decrease steadily, down to 71.4% for an $SO_3$ level of 0.20%. This is apparently due to the fact that the total product material can no longer be separated into two distinct fractions, viz., "floaters", having a density distribution below 1.0 gram per cc, and "sinkers", having a density of 2.3 grams per cc. Because the material having a density greater than 1.0 now includes bubbles as well as beads, the "sinkers" have a density between 1.0 and 2.3 grams per cc. In example 14, the "sinker" density was measured at 1.78 g/cc. By using a liquid with a density greater than 1.0 for the centrifuge separation, the bubble fraction could be increased. It will be noted that the percent of bubbles in the total product for each of Examples 3, 4, 5, 9, 10, 11, 12 and 13 exceeded 81%, ranging as high as 85.9%. The latter figure is significantly higher than 81%, which is the highest yield achieved under identical conditions for any glass compositions previously disclosed by applicant's assignee.

Simple compositions of the type described in the preceding examples are inexpensive and represent presently preferred embodiments of the invention. It has been found possible, however, to make numerous substitutions of these glass-forming components to improve the utility of the invention still further while still obtaining an 81% or higher yield of bubbles, provided that (1) the alkaline earth metal oxide:alkali metal oxide weight ratio remains above 1.0, (2) the glass-forming batch can be melted at a temperature below about 1300° C., so that an adequate amount of sulfur blowing agent is retained, and (3) a $B_2O_3$ content of at least about 10% is maintained in the frit composition. The following examples illustrate the substitution of components.

EXAMPLES 15–24

In Examples 15, 16, and 17, small amounts (less than 1.0%) of $Li_2O$ and $P_2O_5$ are included in the glass frit compositions. These oxides, both individually and in combination, have been found to be useful in preparing lower density glass bubbles than is feasible without them. In Example 15, 0.5% $Li_2O$ replaces $Na_2O$, and in Example 16, 0.5% $P_2O_5$ replaces $SiO_2$.

In Example 15, the alkali metal oxide component of the glass includes 0.5% $Li_2O$ and 7.9% $Na_2O$, resulting in an $RO:R_2O$ ratio of 1.3, the $Li_2O$ being derived from a technical grade of lithium carbonate finer than 420 μm. In Example 16, 0.5% $P_2O_5$ (derived from granular anhydrous tetrasodium pyrophosphate, 90% smaller than 840 μm) replaces some of the $SiO_2$. In Example 17, both $Li_2O$ (0.5%) and $P_2O_5$ (0.4%) are included in the frit composition.

In Examples 18 and 19, the alkaline earth oxide include magnesia and baria respectively. In Example 18, dolomitic limestone (97% no larger than 44 μm) was used, permitting replacement of about 40% of the CaO with MgO. In Example 19, about 18% of the CaO is replaced by BaO, using a powdered analytical grade $BaCO_3$ in the batch. In each example the $RO;R_2O$ ratio is 1:3.

In Example 20, fluorspar (85% no larger than 44 μm) replaces a portion of the $CaCO_3$, introducing about 1.0% $CaF_2$ into the glass frit. The $RO:R_2O$ ratio is 1.4.

In Examples 21 and 22, approximately 3% of alumina replaces a portion of the silica in a glass composition otherwise similar to that of Example 4. In Example 21, a feldspar mineral supplies the $Al_2O_3$ along with some $K_2O$, which is substituted for $Na_2O$. The feldspar which was assumed to contain 68% $SiO_2$, 19.0% $Al_2O_3$, 1.60% CaO, 4.0% $K_2O$, and 7.0% $Na_2O$, was ground so that 90% was not larger than 44 μm. For Example 22, a chemical grade spodumene mineral supplies the alumina, along with some lithia and potassia, which are substituted for soda. The spodumene, which was assumed to contain 64.0% $SiO_2$, 25.0% $Al_2O_3$, 6.0% $Li_2O$, 2.3% $Fe_2O_3$, 1.2% $K_2O$, and 0.6% $Na_2O$, was ground so that 92% was no larger than 74 μm.

In Example 23, 5% PbO (powdered analytical grade red lead) is introduced into the glass composition, replacing 2.5% $SiO_2$ and 2.5% (CaO + $Na_2O$, in the ratio 1.3:1.0).

In Example 24, 1.5% ZnO (98.8% ZnO, 99.99% smaller than 44 μm) is introduced into the batch, replacing an equal weight of CaO.

The benefits of the foregoing (and other) substitutions are well known in the art, and have been discussed widely in regard to improving glass melting operations, improving glass quality, and improving or modifying glass properties.

Examples 15 through 24 were all prepared by the same procedure used in Examples 1–14. The mill outputs were classified by the use of screens and air elutriation to give 142-gram quantities (±17.6 grams) of glass bubble feed particles, of which 90% were smaller than 50.1 ± 3.5 μm, 50% smaller than 25.0±1.4 μm, and 10% smaller than 7.7±1.5 μm.

The amount of sulfur, expressed as $SO_3$ was determined for each of the glass bubble feed samples by iodine titration, measuring the $SO_2$ evolved when a sample of the feed was heated to 1500° C.

The calculated frit compositions are listed together with the measured $SO_3$ contents, which were used in the calculations to normalize the quantities.

TABLE VII

Batch Compositions

| Example No. | SiO$_2$ | Na$_2$O:2B$_2$O$_3$ | Na$_2$CO$_3$ | CaCO$_3$ | Na$_2$SO$_4$ | Other ingredients |
|---|---|---|---|---|---|---|
| 15 | 600 | 130.1 | 16.1 | 179.0 | 30.0 | lithium carbonate, 10.6 |
| 16 | 600 | 124.8 | 30.9 | 173.3 | 35.0 | tetrasodium pyrophosphate, 8.1 |
| 17 | 600 | 130.8 | 18.7 | 180.0 | 20.0 | tetrasodium pyrophosphate, 6.5; lithium carbonate, 10.7 |
| 18 | 600 | 123.9 | 39.9 | — | 30.0 | dolomite limestone, 185 |
| 19 | 600 | 123.9 | 47.3 | 142.3 | 20.0 | barium carbonate, 22.1 |
| 20 | 600 | 123.9 | 42.0 | 163.2 | 20.0 | fluorspar, 12.0 |
| 21 | 534.3 | 137.3 | 11.8 | 186.5 | 40.0 | feldspar, 150 |
| 22 | 494.3 | 120.4 | 32.3 | 168.1 | 20.0 | spodumene, 100 |
| 23 | 600 | 128.5 | 33.1 | 156.9 | 20.0 | red lead, 45.6 |
| 24 | 600 | 123.9 | 47.3 | 149.9 | 20.0 | zinc oxide, 12.9 |

TABLE VIII

Calculated Oxide Content of Glass Frit Compositions (Weight %) for Examples 15–24, Corrected for Measured Sulfur Content, Expressed as SO$_3$

| Example No. | SiO$_2$ | B$_2$O$_3$ | CaO | Na$_2$O | SO$_3$ | Other ingredients |
|---|---|---|---|---|---|---|
| 15 | 69.16 | 10.37 | 11.56 | 7.21 | 1.20 | Li$_2$O, 0.49 |
| 16 | 68.66 | 9.88 | 11.11 | 8.64 | 1.21 | P$_2$O$_5$, 0.49 |
| 17 | 68.81 | 10.38 | 11.57 | 7.22 | 1.13 | Li$_2$O, 0.49; P$_2$O$_5$, 0.40 |
| 18 | 69.56 | 9.94 | 6.65 | 8.65 | 0.63 | MgO, 4.58 |
| 19 | 69.52 | 9.93 | 9.24 | 8.64 | 0.68 | BaO, 1.99 |
| 20 | 69.33 | 9.90 | 10.57 | 8.25 | 0.96 | CaF$_2$, 0.99 |
| 21 | 66.38 | 9.91 | 11.15 | 8.04 | 0.93 | Al$_2$O$_3$ 2.97; K$_2$O, 0.62 |
| 22 | 66.37 | 9.91 | 11.19 | 7.77 | 0.94 | Al$_2$O$_3$, 2.97; Li$_2$O, 0.71; |

TABLE VIII-continued

Calculated Oxide Content of Glass Frit Compositions (Weight %) for Examples 15-24, Corrected for Measured Sulfur Content, Expressed as $SO_3$

| Example No. | $SiO_2$ | $B_2O_3$ | CaO | $Na_2O$ | $SO_3$ | Other ingredients |
|---|---|---|---|---|---|---|
| | | | | | | $K_2O$, 0.14 |
| 23 | 66.95 | 9.92 | 9.81 | 7.55 | 0.82 | PbO, 4.96 |
| 24 | 69.53 | 9.92 | 9.73 | 8.64 | 0.67 | ZnO, 1.49 |

A 30-gram aliquot of each bubble feed sample was passed through a natural gas/air flame as in previous examples and the resulting free-flowing mass of glass bubble-containing products collected. The products were then characterized as in previous examples. The results of these determinations are listed, together with the corresponding fractions of the total product materials recovered as a percentage of the bubble feed imput.

For Examples 16 and 21, samples of the glass bubbles separated from the total product material were quantitatively analyzed to determine their oxide compositions. The results for the main oxide components are listed; in each case, there was also less than 0.02% $Li_2O$ and 0.02% ZnO. For Example 16, there was less than a combined total of 0.65% for $Al_2O_3$, $Fe_2O_3$, and MgO. For Example 21, there was less than 0.02% $P_2O_5$ and less than a combined total of 0.24% for $Fe_2O_3$ and MgO.

TABLE IX

Results of Bubble Forming for Examples 15 through 24

| Example No. | Percent of feed collected as total product | Total product density, g/cc | Weight percent in total product | Density of bubbles g/cc |
|---|---|---|---|---|
| 15 | 81.2 | 0.113 | 86.1 | 0.098 |
| 16 | 87.3 | 0.120 | 83.5 | 0.101 |
| 17 | 83.5 | 0.114 | 84.4 | 0.097 |
| 18 | 85.6 | 0.227 | 86.0 | 0.198 |
| 19 | 86.7 | 0.204 | 84.4 | 0.175 |
| 20 | 83.6 | 0.138 | 85.5 | 0.119 |
| 21 | 89.5 | 0.176 | 85.8 | 0.153 |
| 22 | 82.5 | 0.188 | 84.1 | 0.160 |
| 23 | 81.7 | 0.165 | 82.0 | 0.137 |
| 24 | 86.3 | 0.198 | 86.3 | 0.173 |

TABLE X

Results of Quantitative Analyses of Glass Bubbles for Examples 16 and 21 Expressed in Weight Percent

| Example No. | $SiO_2$ | $B_2O_3$ | CaO | $Na_2O$ | $SO_3$ | Other Ingredients |
|---|---|---|---|---|---|---|
| 16 | 74.5 | 3.85 | 12.7 | 6.34 | 1.31 | $P_2O_5$, 0.39 |
| 21 | 73.3 | 4.63 | 12.2 | 5.65 | 1.13 | $K_2O$, 0.44 |
| | | | | | | $Al_2O_3$, 2.87 |

I claim:

1. Microbubbles of glass having an alkaline earth metal oxide:alkali metal oxide weight ratio in the range of 1.2:1-3.0:1; at least 97% of the glass weight consisting essentially of 70-80% $SiO_2$, 8-15% CaO, 3-8% $Na_2O$, and 2-6% $B_2O_3$.

2. The microbubbles of claim 1 wherein the density of the microbubbles is in the range of 0.08 to 0.8.

3. The microbubbles of claim 1 wherein the CaO:$Na_2O$ ratio is in the range of 1.2:1-3.0:1.

4. The microbubbles of claim 3 wherein the CaO:$Na_2O$ ratio is at least 1.9:1.

5. A free-flowing mass of glass particles, at least 70% by weight of which are the microbubbles of claim 2.

6. Microbubbles of glass having an alkaline earth metal oxide:alkali metal oxide weight ratio in the range of 1.2:1-3.0:1, and a density in the range of 0.08-0.8, at least 90% of the glass weight consisting essentially of 70-80% $SiO_2$, 8-15% CaO, 3-8% $Na_2O$, and 2-6% $B_2O_3$.

7. A free flowing mass of glass particles, at least 70% by weight of which are the microbubbles of claim 6.

8. The glass particles of claim 7 wherein the alkaline earth metal oxide:alkali metal oxide ratio of the microbubbles is at least 1.9:1.

9. The microbubbles of claim 1 wherein the glass contains up to about 1.0% $P_2O_5$ and/or 1.0% $Li_2O$.

10. The microbubbles of claim 9 wherein the glass contains up to about 1.5% $SO_3$.

11. Microbubbles of glass having an alkaline earth metal oxide:alkali metal oxide weight ratio in the range of 1.2:1-3.0:1, at least 90% of the glass weight consisting essentially of 70-80% $SiO_2$, 8-15% RO, 3-8% $R_2O$, and 2-6% $B_2O_3$, wherein R is at least one metal having the indicated valence.

12. The microbubbles of claim 11 wherein the alkaline earth metal oxide:alkali metal oxide weight ratio is at least 1.9:1.

13. The microbubbles of claim 11 wherein at least 97% of the glass weight consists essentially of 70-80% $SiO_2$, 8-15% RO, 3-8% $R_2O$, and 2-6% $B_2O_3$, wherein R is at least one metal having the indicated valence.

14. The microbubbles of claim 13 wherein the alkaline earth metal oxide:alkali metal oxide weight ratio is at least 1.9.

15. A free-flowing mass of glass particles, at least 70% by weight of which are the microbubbles of claim 11.

16. A free-flowing mass of glass particles, at least 70% by weight of which are the microbubbles of claim 12.

17. A free-flowing mass of glass particles, at least 70% by weight of which are the microbubbles of claim 13.

18. A free-flowing mass of glass particles, at least 70% by weight of which are the microbubbles of claim 14.

* * * * *